United States Patent [19]
van de Polder

[11] Patent Number: 4,567,520
[45] Date of Patent: Jan. 28, 1986

[54] TELEVISION CIRCUIT ARRANGEMENT FOR DETERMINING IN A VIDEO SIGNAL FRAME PERIODS COMPRISING TWO FIELD PERIODS

[75] Inventor: Leendert J. van de Polder, Eindhoven, Netherlands

[73] Assignee: U.S. Philips Corporation, New York, N.Y.

[21] Appl. No.: 578,915

[22] Filed: Feb. 10, 1984

[30] Foreign Application Priority Data

Feb. 17, 1983 [NL] Netherlands .......................... 8300592

[51] Int. Cl.[4] .......................................... H04N 17/00
[52] U.S. Cl. .................................................. 358/139
[58] Field of Search ............... 358/139, 10, 140, 153, 358/148, 52

[56] References Cited

U.S. PATENT DOCUMENTS

| | | | |
|---|---|---|---|
| 3,485,950 | 12/1969 | Reiser | 358/139 |
| 3,886,589 | 5/1975 | Nasu | 358/313 |
| 4,145,713 | 3/1979 | White | 358/139 X |

OTHER PUBLICATIONS

"Journal of the SMPTE"; Pearson et al.; vol. 82, #1, Jan. '73, pp. 17-21.

*Primary Examiner*—Howard W. Britton
*Assistant Examiner*—Victor R. Kostak
*Attorney, Agent, or Firm*—Thomas A. Briody; William J. Streeter; Edward W. Goodman

[57] ABSTRACT

A television circuit arrangement for determining in a video signal (VS), frame periods comprising two field periods when a picture signal repeated in cycles of two successive field periods and with a possible change of picture content therebetween is present. Signal sources, such as, for example, cine-film television converters and "field skip" signal storage- and display devices, supply such a signal. It may be required for signal processing operations improving the picture quality during display, to use the cycles as frame periods. For this purpose, the circuit arrangement is provided with a switching circuit (S1-S6), a first (C1,S1,S4) and a second signal integration circuit (C2,S2,S5) which can be reset and are alternately operative every other field period, and a succeeding signal comparison circuit (AMP,S6) for supplying a voltage (VV) determining the frame period.

4 Claims, 2 Drawing Figures

TELEVISION CIRCUIT ARRANGEMENT FOR DETERMINING IN A VIDEO SIGNAL FRAME PERIODS COMPRISING TWO FIELD PERIODS

BACKGROUND OF THE INVENTION

The invention relates to a television circuit arrangement for determining in a video signal, frame periods comprising two field periods, whereby a video signal comprising a picture signal is present at an input terminal and originates from a signal source for supplying a picture signal repeated in cycles of two successive field periods and with a possible change of picture content.

Such a television circuit arrangement can be used with a signal source described in U.S. Pat. No. 3,886,589 which is, for example, in the form of a so-called "field skip" signal storage and display device or of a cine-film television converter. With the use of such a storage and display device, the picture signals are stored only every other field period. When the stored signal is produced by the device, the stored information is repeated once in the next field period. Thus, a television picture signal is obtained repeated in cycles of two successive field periods and, possibly, varying therebetween in a stepwise manner as caused by picture content changes.

In the case of the cine-film television converter as the signal source, the information associated with one cine-film picture does not occur in one field period of the picture signal, but it occurs repeatedly in the next field period. Further, abrupt variations between the cine-film pictures frequently occur due to the film assembly of separately recorded scenes. Also in this case, the result is that the signal source supplies the television picture signal repeated in cycles of two successive field periods and, possibly, varying therebetween in a stepwise manner.

SUMMARY OF THE INVENTION

The invention has for its object to provide a television circuit arrangement by which it can be determined simply and automatically in the succession of field periods for the picture signal varying in a stepwise manner, which field periods together constitute the cycle. Such a determination of the cycle, which is then assumed to be equal to a television frame period, is of importance for given picture signal processing operations, such as for obtaining a flicker reduction during picture display or for obtaining an improvement of the picture quality by means of field and line frequency doubling. A television circuit arrangement according to the invention is therefore characterized in that the television circuit arrangement is provided with a switching circuit, a first and a second signal integration circuit and a signal comparison circuit connected thereto, the first and the second signal integration circuit being coupled via this switching circuit alternately every other field period to the signal source, during at least a part of a field period, after an operation of resetting to a reference value, while further, before one of the resetting operations takes place, the signal comparison circuit is operative for supplying a voltage depending upon the comparison of the two signal integrations to an output terminal of the television circuit arrangement.

An embodiment of a television circuit arrangement according to the invention, in which an optimum signal integration is effected, is characterized in that the television circuit arrangement is provided with a voltage-current converter preceding the first and the second signal integration circuit.

Another embodiment with an optimum signal comparison is characterized in that the signal comparison circuit is provided with a differential amplifier and succeeding switch forming part of the switching circuit and connected to the output terminal.

It should be noted that there is described in the magazine "Journal of the SMPTE", Vol. 82, No. 1, January 1973, pages 17–21, a movement detector composed of inter alia one resettable signal integration circuit, followed by two sample-and-hold circuits, in turn, followed by a signal comparison circuit. In this case, the signal integration circuit is reset each frame period comprising two field periods, whereby in every other frame period, one of the two sample circuits is always operative. A change in the integrated information leads to a detection of movement. Apart from the fact that the field of application of the movement detection is different, the frame period determination according to the present invention by means of two resettable signal integration circuits for the field period has the advantage of the absence of separate sample-and-hold circuits. The two signal integration circuits are each coupled directly to a respective input of the signal comparison circuit, which, without the separate signal sampling-and-holding step as an additional signal processing step, means a more accurate determination of the frame period.

DESCRIPTION OF THE DRAWING

The invention will be described more fully, by way of example, with reference to the accompanying drawing, in which.

DESCRIPTION OF THE PREFERRED EMBODIMENT

Figure 1:
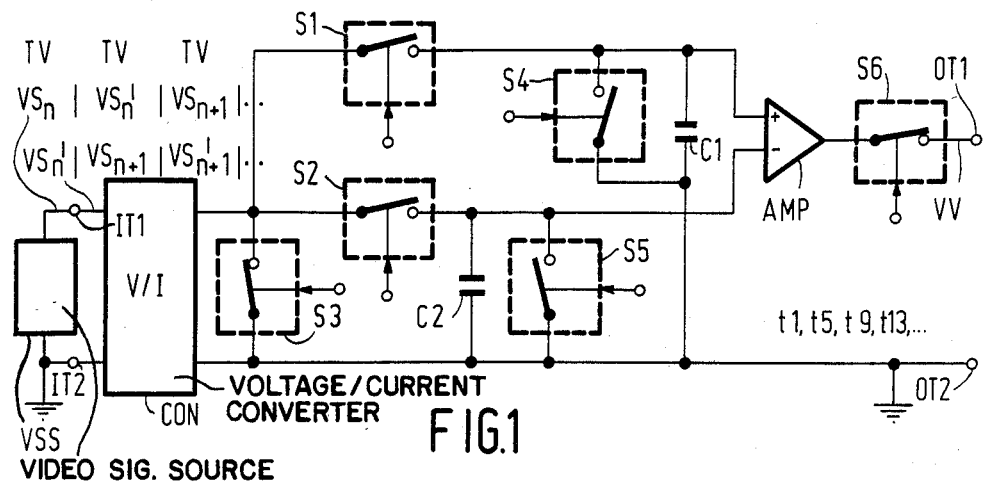
FIG. 1 shows the circuit diagram of an embodiment of a television circuit arrangement according to the invention.

In the television circuit arrangement shown in FIG. 1, VSS designates a signal source. The signal source VSS serves to supply a video signal VS which is composed of a picture signal and line- and field-blanking and synchronization signals. Of the video signals VS FIG. 1 represents a few informations occurring in field periods TV and designated $VS_n$, $VS_n'$, $VS_{n+1}$ and $VS_{n+1}'$. The accent notation is used to indicate that a repeated information is concerned. It is assumed that the signal source VSS serves to supply a picture signal repeated in cycles of two successive field periods TV (informations $VS_n$ and $VS_n'$) and varying therebetween in a stepwise manner (between informations $VS_n'$ and $VS_{n+1}$). As examples, the signal source VSS may be a "field skip" signal storage and display device or a cine-film television converter. In both cases, the (picture) informations occur in the video signal VS in a succession of field periods TV in the order of succession $VS_{n-1}, VS_{n-1}'$, $VS_n$, $VS_n'$, $VS_{n+1}$, $VS_{n+1}'$ etc. In FIG. 1, for a given time duration of three field periods TV, two possible orders of succession of picture informations are designated by $VS_n|VS_n'|VS_{n+1}$ and $VS_n'|VS_{n+1}|VS_{n+1}'$.

In given picture signal processing operations, it may be of importance to have an indication of which picture informations in the succession of the field periods TV belong together, and to consider the latter then as occurring in frame periods comprising two field periods, as they occur in interlaced television systems. Such an indication may be used in obtaining a flicker reduction in picture display. It may further be used for obtaining an improvement of the picture quality by means of field and line frequency doubling. The improvement in picture quality is attained by displaying the information associated with a (standardized) field period twice during every half field period. In this case, the informations associated with two successive field periods (1 and 2) can be displayed in the field repetition sequence 1-1/2-2 or 1-2/1-2 per (standardized) frame period. In case the field repetition sequence 1-2/1-2 is chosen, it is favorable for the picture quality to use the cycles with the picture informations $VS_n$, $VS_n'$ for the field periods 1 and 2 and it would be unfavorable to use therefor the successive picture informations $VS_n'$, $VS_{n+1}$.

Figure 2:
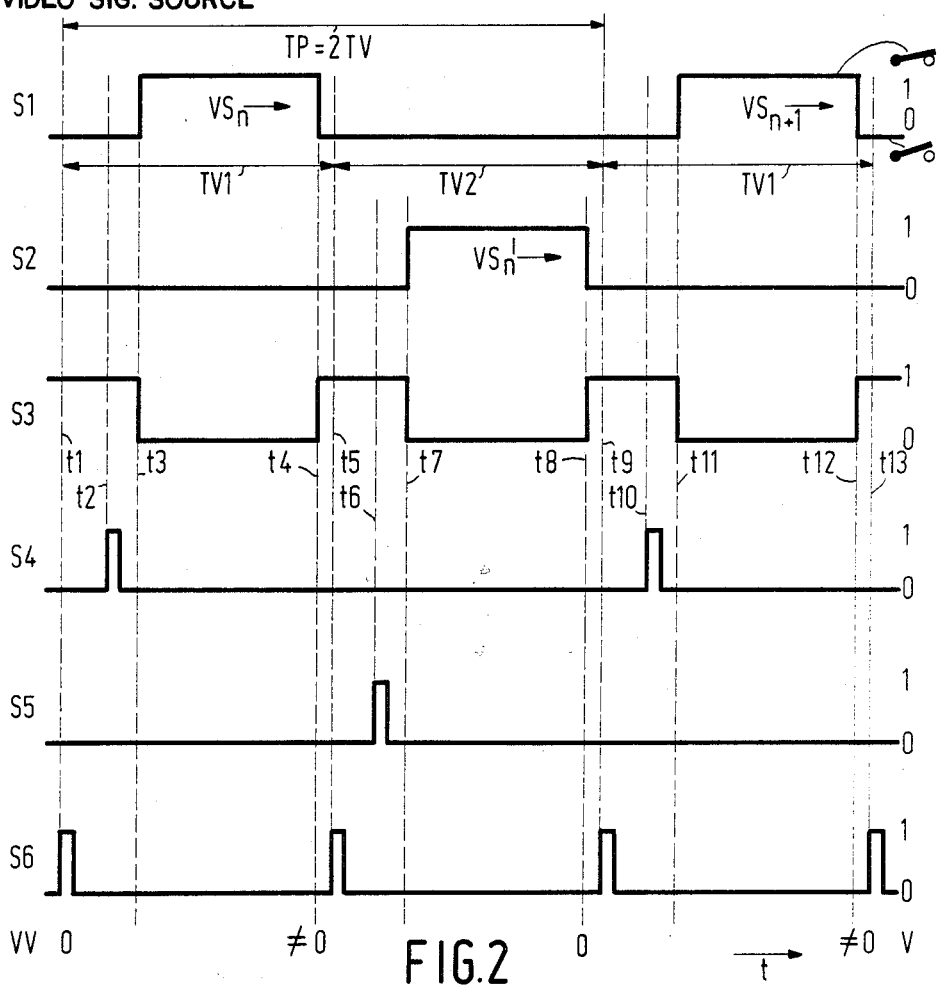
FIG. 2 shows time diagrams of switching signals to be used for explanation of the operation of the circuit arrangement shown in FIG. 1.

For determining in the video signal VS a frame period (TP=2TV) comprising two field periods TV (TV1 and TV2), the circuit arrangement shown in FIG. 1 is utilized. The signal source VSS is connected between two input terminals IT1 and IT2 of the television circuit arrangement, the terminal IT2 being connected to ground. The television circuit shown in FIG. 1 may be present in a television receiver or -monitor or in a television studio. The signal source VSS may be present near the television circuit arrangement or at a certain distance from it. It is only of importance that the input terminal IT1 receives the video signal VS with the picture signal repeated in cycles of two successive field periods TV ($VS_n$, $VS_n'$) and varying therebetween in a stepwise manner ($VS_n'$, $VS_{n+1}$). In the television circuit arrangement, the input terminals IT1 and IT2 are connected to a linear voltage/current converter CON. The construction of the converter CON for the linear conversion (V/I) of a supplied voltage V into an associated current I is not described in detail; known voltage/current converters can be used. One output of the converter CON is connected to three switches S1, S2 and S3, while another output is connected to ground. The switches S1, S2 and S3 constitute with three further switches S4, S5 and S6, a switching circuit (S1–S6). The switches S1 to S6 are shown for the sake of simplicity as mechanical switches, but in practice they will be constructed as electronic switches. Switching signals are then supplied to the switches S1 to S6 of FIG. 1, which are designated by the same references in FIG. 2 as a function of the time t. The switching signals S1 to S6 of FIG. 2 are plotted as time diagrams between logic values 1 and 0 which correspond to the closed and the open conditions, respectively, of the relevant switch of FIG. 1, as indicated at the switching signal S1 of FIG. 2. Further, a time diagram of a voltage VV is plotted in FIG. 2, which voltage VV occurs at an output terminal OT1 of the television circuit arrangement of FIG. 1, which further has an output terminal OT2 connected to ground. It applies, for the voltage VV, that in given time intervals, it is more or less equal to OV or is unequal to OV (in FIG. 2: ≠OV). Instants which are of importance for the explanation of the operation of the circuit arrangement shown in FIG. 1, are designated in FIG. 2 by t1, t2, t3 to t13. Corresponding instants per field period TV are the instants t1, t5, t9 and t13, the instants t2, t6 and t10, the instants t3, t7 and t11 and the instants t4, t8 and t12.

In FIG. 1 it is shown that a capacitor C1 is connected parallel to the switch S4, the parallelcombination being connected in series with the switch S1 between the outputs of the converter CON. The switches S1 and S4 and the capacitor C1 together constitute a signal integration circuit (C1,S1,S4). Similarly, a capacitor C2 constitutes, with the switches S5 and S2, a signal integration circuit (C2,S2,S5). The switch S3 is present as a short-circuit switch between the outputs of the converter CON. The use of the linear voltage/current converter CON preceding the signal integration circuits (C1,S1,S4) and (C2,S2,S5) leads to an optimum signal integration.

The junction point of the capacitor C1 and the switch S1 is connected to a (+) input of a differential amplifier AMP. A (−) input of the differential amplifier AMP is connected to the junction point of the capacitor C2 and the switch S2. An output of the differential amplifier AMP is connected via the switch S6 to the output terminal OT1. The differential amplifier AMP and the switch S6 together constitute a signal comparison circuit (AMP,S6).

In the circuit arrangement shown in FIG. 1, there is indicated with instants t1, t5, t9, t13 . . . that the switch positions shown are associated therewith, as also appears from the time diagrams of FIG. 2, with closed switches S3 and S6 (conducting) and opened switches S1, S2, S4 and S5 (interrupted).

In FIG. 2, three full successive field periods TV are denoted by TV1, TV2 and TV1. It is then assumed for FIG. 2 that the picture informations $VS_n$, $VS_n'$ and $VS_{n+1}$ are successively present at the input terminal IT1 of FIG. 1. With respect to the signal integration circuits (C1,S1,S4) and (C2,S2,S5) it holds that they are reset, before a signal integration is effected, under the control of the switching signals S4 and S5, respectively. During this resetting operation from the instants t2 and t10 and from the instant t6, respectively, the capacitors C1 and C2, respectively, are fully discharged so that the ground potential is present as a reference value. It follows from the switching signal S1 of FIG. 2 that in the first field period, a signal integration is effected in the time interval t3–t4. After the resetting operation at the instant t2 (signal S4), the signal integration circuit (C1,S1,S4) takes up a part of the (picture) information $VS_n$. It appears from the switching signal S2 of FIG. 2 that after the resetting operation at the instant t6 (signal S5), the signal integration circuit (C2,S2,S5) takes up a part of the (picture) information $VS_n'$ during the field period TV2 between the instants t7 and t8. The equal time intervals t3–t4 and t7–t8 may comprise, for example, about two hundred line periods, the video signal VS comprising the field and line synchronizing information. It appears from the switching signal S3 that in the intermediate time interval t4–t7, the outputs of the voltage/current converter CON are shortcircuited. It appears from the switching signal S6 of FIG. 2 that from the instant t9, the switch S6 of FIG. 1 is closed for a short time. Since it is assumed that the picture informations $VS_n$ and $VS_n'$ are taken up by the signal integration circuits (C1,S1,S4) and (C2,S2,S5), respectively, the result is that the signal comparison circuit (AMP,S6) supplies a voltage VV approximately equal to zero Volt (VV=0 V) to the output terminal OT1. During the preceding closure of the switch S6 from the instant t5, it is indicated in FIG. 2 that it holds for the voltage VV that: VV≠0 V. The picture information $VS_{n-1}'$ was then present in the signal integration circuit (C2,S2,S5), as can be derived from the switching signal S2 of FIG. 2, while the consequently different picture information $VS_n$ was present in the signal integration circuit (C1,S1,S4). It appears from the voltage VV with VV=0 V at the instant t9 and VV≠0 V at the instant t5, that the picture informations associated with the preceding field periods TV are equal to each other, as has been stated. The frame period TP=2 TV indicated in FIG. 2 is associated with this result.

It follows from the voltage VV in FIG. 2 with VV≠0 V at the instant t13 that, on an average over one field period, the picture information $VS_n'$ is not equal to the picture information $VS_{n+1}$, which informations are indicated at the signals S2 and S1.

In the case in which there is no difference or only a small difference between picture informations associated with several successive field periods TV, it will invariably hold for the voltage VV that VV=0 V. The frame period TP then cannot be determined unambiguously, but this is not necessary either because the successive picture informations are more or less equal. A variation in picture information leading to VV≠0 V is then sufficient to conclude that the preceding and the following field periods TV constitute a frame period TP which is followed by the next frame periods TP.

After each abrupt variation in the picture information, the instantaneous frame period TP=2 TV can then be determined by means of the voltage VV of FIG. 2 with successively VV≠0 V and VV=0 V. In the signal comparison by means of the differential amplifier AMP, a signal threshold can be present in order that subordinate negligible variations in picture information will not lead to a variation in the frame period. Such an always present threshold in differential amplifiers leads to an optimum signal comparison.

In the case of a cine-film/television conversion, essentially 24 film pictures per second have to be converted into 25 or 30 television pictures at a field frequency of 50 and 60 Hz, respectively. At the field frequency of 50 Hz the film is run off with 25 film pictures per second and they arrive, being repeated once, in 50 field periods. In the said patent, it is indicated for the field frequency of 60 Hz that, when the film is run off with 24 film pictures per second, 12 film pictures arrive, alternately being repeated once and twice, in $2 \times 12 + 3 \times 12 = 60$ field periods. Starting from a number of successive abrupt picture information variations and an order of succession of picture informations $VS_n$, $VS_n'$, $VS_n''$, $VS_{n+1}$, $VS_{n+1}'$, $VS_{n+1}''$, $VS_{n+2}$, $VS_{n+2}'$, $VS_{n+2}''$, $VS_{n+3}$ etc., there follows in the manner shown for FIG. 2 for the voltage VV the order of succession: 0, ≠0, 0, 0, ≠0, 0, ≠0, 0, 0, ≠0, etc. The order of succession of television pictures can also be recognized from this order of succession.

What is claimed is:

1. A television circuit arrangement for determining in a video signal, frame periods comprising two field periods, whereby a video signal comprising a picture signal is present at an input terminal and originates from a signal source for supplying a picture signal repeated in cycles of two successive field periods and with a possible change of picture content, characterized in that the television circuit arrangement is provided with a switching circuit, a first and a second signal integration circuit and a signal comparison circuit connected thereto, the first and the second signal integration circuits being coupled via the switching circuit alternately every other field period to the signal source, during at least a part of a field period, after an operation of resetting to a reference value, while further, before one of the said resetting operations takes place, the signal comparison circuit is operative for supplying a voltage depending upon the comparison of the two signal integrations to an output terminal of the television circuit arrangement.

2. A television circuit arrangement as claimed in claim 1, characterized in that the signal comparison circuit is provided with a differential amplifier and a succeeding switch forming part of said switching circuit and connected to the output terminal.

3. A television circuit arrangement as claimed in claim 1, characterized in that the television circuit arrangement is provided with a voltage/current converter preceding the first and the second signal integration circuits.

4. A television circuit arrangement as claimed in claim 3, characterized in that the signal comparison circuit is provided with a differential amplifier and a succeeding switch forming part of the said switching circuit and connected to the output terminal.

* * * * *